United States Patent [19]

Salvatore et al.

[11] Patent Number: 5,284,309
[45] Date of Patent: Feb. 8, 1994

[54] PROPELLANT IMMOBILIZING SYSTEM AND METHOD

[75] Inventors: Jeremiah O. Salvatore, Redondo Beach; John R. Murphy, El Segundo, both of Calif.

[73] Assignee: Hughes Aircraft Company, Los Angeles, Calif.

[21] Appl. No.: 992,397

[22] Filed: Dec. 18, 1992

[51] Int. Cl.$^5$ .............................................. B64D 37/00
[52] U.S. Cl. .................. 244/135 C; 244/164; 244/167
[58] Field of Search ............... 244/93, 164, 167, 169, 244/172, 135 C

[56] References Cited

U.S. PATENT DOCUMENTS

| | | | |
|---|---|---|---|
| 2,774,305 | 12/1956 | Fitzgerald et al. | 244/93 |
| 4,664,343 | 5/1987 | Lofts et al. | 244/172 |
| 4,722,183 | 2/1988 | Rosen | 244/172 |
| 4,776,541 | 10/1988 | Maynard | 244/164 |
| 5,058,834 | 10/1991 | Hubert | 244/164 |
| 5,130,931 | 7/1992 | Paluszek et al. | 244/164 |
| 5,139,217 | 8/1992 | Adams | 244/164 |

FOREIGN PATENT DOCUMENTS

| | | | |
|---|---|---|---|
| 2051246 | 1/1981 | United Kingdom | 244/172 |
| 2138375 | 10/1984 | United Kingdom | 244/164 |

*Primary Examiner*—Michael S. Huppert
*Assistant Examiner*—Virna Lissi Ansley
*Attorney, Agent, or Firm*—William J. Streeter; Wanda K. Denson-Low

[57] ABSTRACT

A propellant immobilizing system and method in which propellant motion in the propellant storage tanks (22) is reduced or eliminated during velocity change maneuvers to reduce disturbance torques acting upon the spacecraft (10) and improving the spacecraft attitude pointing performance. The thrusters (14, 16, 18 or 20) are fired to produce a small impulse in the direction of the desired Velocity change to begin motion of the propellant within the fuel tank in the opposite direction. After the fuel has moved within the tank to a location in which the propellant center of mass is aligned with the propellant tank (22) center of curvature in the direction of the desired velocity change, thrusters (14, 16, 18 or 20) are again fired to produce a force in the direction of the current velocity of the propellant center of mass to stop the propellant center of mass relative to the propellant tank (22). With the center mass of the propellant now aligned with the propellant tank center of curvature in the direction of the desired velocity change, the thrusters (14, 16, 18 or 20) are again fired to produce the desired velocity change with the propellant center of mass now being trapped in the propellant tank such that additional motion of the propellant is inhibited. After completion of the maneuver, the propellant gradually migrates back to its original position due to the influence of a propellant management device within the propellant tank.

13 Claims, 2 Drawing Sheets

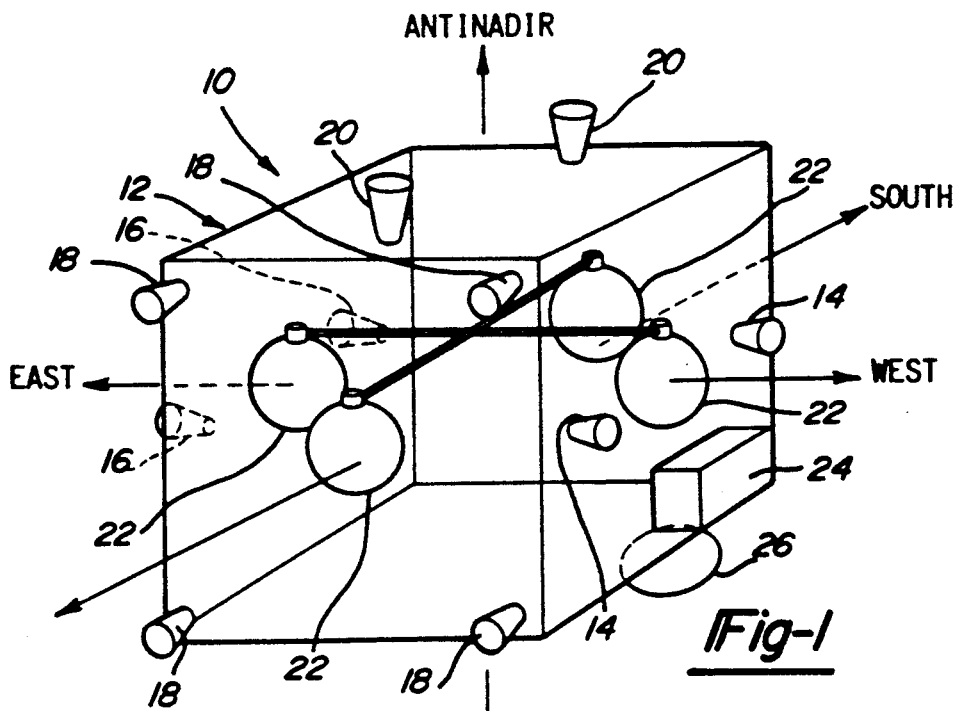
Fig-1
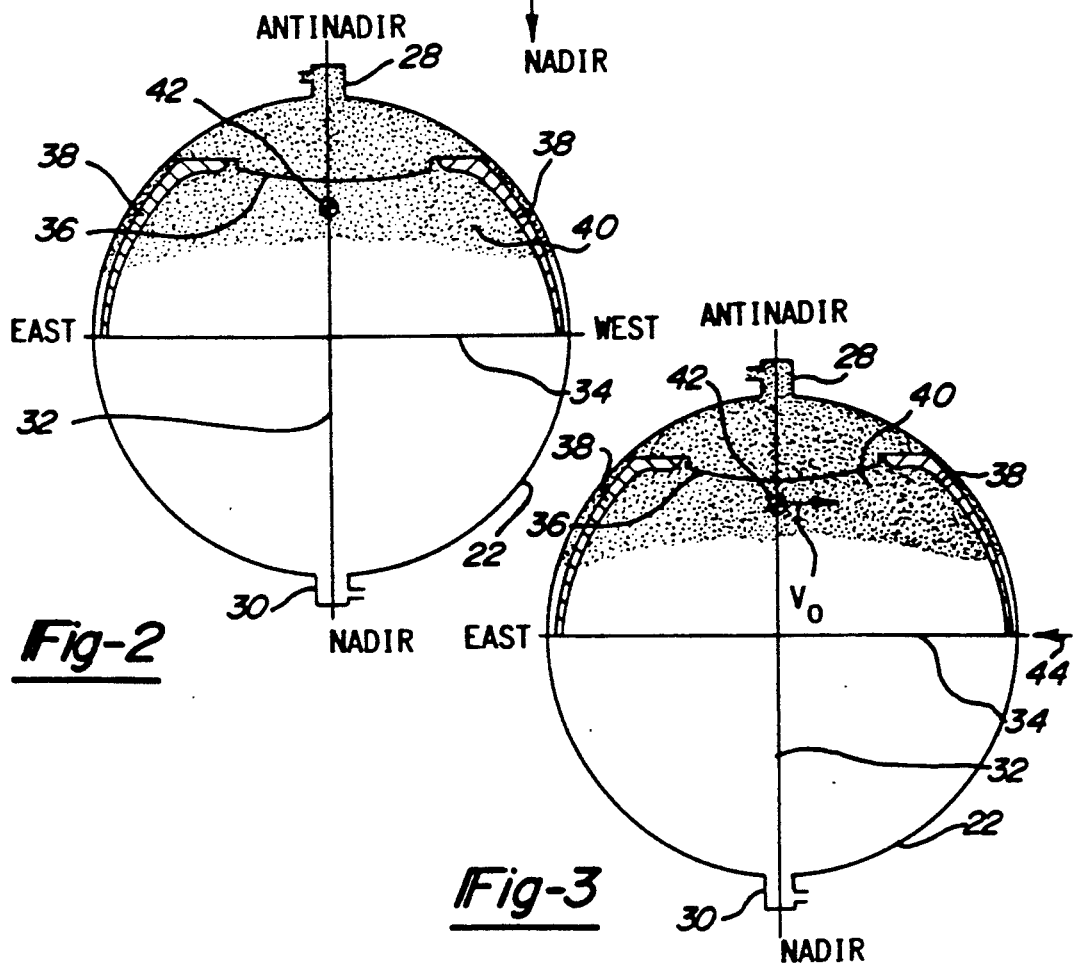
Fig-2
Fig-3

PROPELLANT IMMOBILIZING SYSTEM AND METHOD

TECHNICAL FIELD

The present invention relates to a three axis stabilized spacecraft and in particular to a system and method for immobilizing propellant in the spacecraft propellant tanks during velocity change maneuvers to reduce propellant motion induced by the thruster activity and the disturbance torques caused thereby.

BACKGROUND

Orbit maintenance requirements for a spacecraft dictate the periodic need to fire the space craft thrusters to perform various maneuvers. One example is a stationkeeping maneuver requiring the firing of the thrusters on the East-West sides of the spacecraft (East-West maneuvers) or on the North-South sides of the spacecraft (North-South maneuvers). Propellant motion induced by the thruster activity necessary to perform these maneuvers produces disturbance torques on the spacecraft which degrade the spacecraft attitude pointing performance. These disturbances persist until natural dissipation effects in the propellant reduce its relative motion to quiescence. The disturbance torques affect the spacecraft attitude and, therefore, the spacecraft pointing performance.

To maintain the proper spacecraft attitude, during and after a stationkeeping maneuver, the attitude control of the spacecraft is changed to a special gyro-based attitude control scheme in order to meet the attitude pointing requirements of the spacecraft in the presence of the disturbance torques produced by the fuel motion. The special attitude control scheme requires the expenditure of a significant amount of propellant and may require the relaxation of the pointing performance specifications during and after the stationkeeping maneuver until the propellant has reached quiescence.

Another method used to reduce the disturbance torques during a stationkeeping maneuver is to use stationkeeping thrusters having very low thrust levels in order to minimize induced disturbances. Such thrusters, however, have limited utility during other mission phases such as the orbit acquisition phase or nutation damping phases. Larger redundant thrusters are needed to provide the same levels of thruster margin for the acquisition and nutation damping phases. The use of redundant thrusters increases the complexity and cost of the spacecraft.

SUMMARY OF INVENTION

The propellant immobilization system and method of the present invention utilizes propellant management devices within the propellant tanks to attract and hold liquid propellant in a particular place within the tanks and a specially timed sequence of impulses to accomplish the stationkeeping or other velocity change maneuver. This sequence of pulses allows the propellant to be moved to a favorable location within the tanks for the maneuver and to be stopped relative to the tanks once it reaches this location. When the maneuver is performed, the amount of propellant motion induced by the maneuver is significantly reduced, thereby reducing the disturbance torques on the spacecraft and shortening the time needed for the propellant to reach quiescence. With proper tuning of the pulse durations and timing, both the need for the relaxed attitude pointing specifications and the special attitude control scheme can be reduced or eliminated.

By reducing the time required for the special attitude control schemes, propellant usage (to control attitude) will be reduced. Furthermore, the wear from operation of inertial reference units (IRU's), or gyros will also be reduced as will be the duration of the degraded pointing performance. If the special attitude control scheme can be eliminated from the spacecraft design, then no propellant usage would be needed for attitude control during stationkeeping maneuvers. The spacecraft design, testing, manufacture and operation would be simplified and cost would be reduced. While the propellant expenditure needed to accomplish the maneuver is increased by the thruster firing to move the propellant to the desired location within the tanks, total propellant usage is reduced by eliminating or reducing propellant usage to maintain spacecraft attitude.

The propellant is immobilized by the following sequence of thruster firing. First, one or more thrusters are fired to produce a first impulse intended to create motion of the propellant relative to the tank. The impulse is in a direction to cause the propellant center of mass to move from its original location adjacent the propellant management device along the curved wall of the tank until the propellant center of mass is moved to a location where a line extending from the propellant center of mass to the center of curvature of the tank wall is parallel to, and directly towards, the desired velocity change increment.

Second, one or more thrusters are fired to produce a second impulse in the current direction of motion of the propellant center of mass relative to the tank to null the motion of the propellant center of mass relative to the tank. This impulse is the same or slightly less than the first impulse.

Third, with the propellant stopped relative to the tank, one or more thrusters are fired to produce the desired velocity change. Because the propellant has been moved to the "rear" of the tank relative to the direction of the velocity change, the propellant will remain trapped in this location in reaction to the force of the thrusters. Propellant motion from the maneuver and the disturbance torques caused thereby are reduced. When the velocity change maneuver is completed, the propellant slowly migrates back to its original position due to the operation of the propellant management device within the propellant tank.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a spacecraft body showing propellant tanks and thrusters mounted to the spacecraft body; and FIGS. 2, 3, 4 and 5 are schematic diagrams of one of the propellant storage tank illustrating the thruster firing sequence for the propellant immobilization method of the present invention and the propellant motion induced by the impulses.

DETAILED DESCRIPTION OF THE INVENTION

Figure 4:
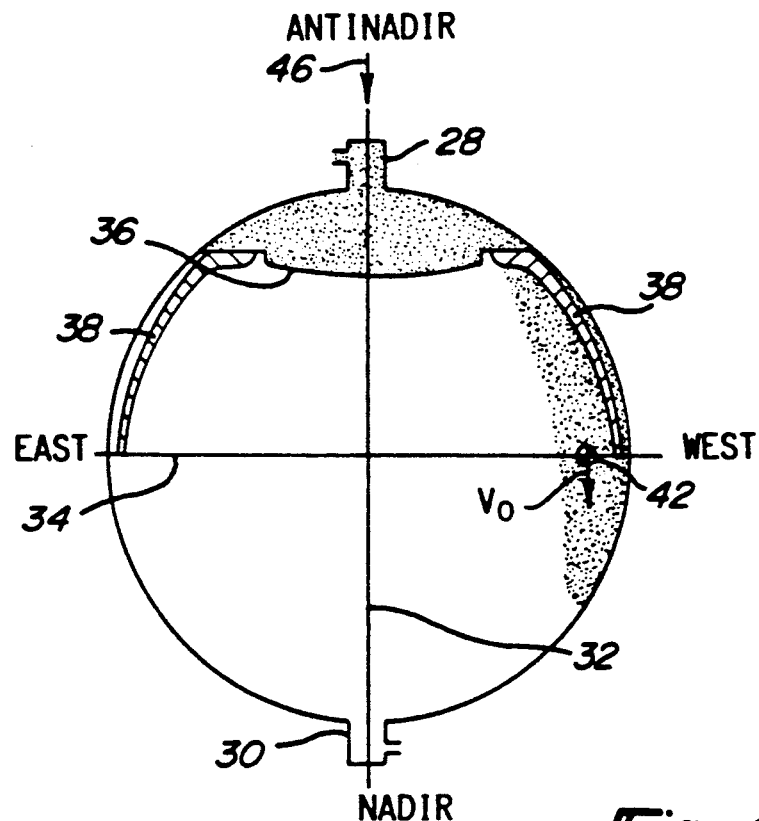

The spacecraft 10, shown in FIG. 1, includes the propellant immobilization system of the present invention. Spacecraft 10 includes a body 12 to which various components of the spacecraft such as solar panels, etc. are attached. Those components not pertinent to the present invention have been deleted to improve clarity. Body 12 is shown as a cube having six surfaces labeled North, South, East, West, nadir and anti-nadir to illustrate the direction toward which each surface is oriented. It is to be understood that while the spacecraft body is shown and described as a cube for simplicity, that other shapes and body orientations are not precluded.

Spacecraft 10 is equipped with a plurality of thrusters of which only a portion are shown. These include West thrusters 14 on the West side of the spacecraft to produce a thrust directed toward the East, East thrusters 16 on the East side of the spacecraft body to produce a thrust toward the West, North thrusters 18 on the North side of the spacecraft to produce a thrust toward the South and Anti-nadir thrusters 20 on the anti-nadir side of the spacecraft to produce a thrust toward the nadir. Liquid propellant for the thrusters is contained in the four propellant tanks 22 within the spacecraft body and connected to the thrusters in a conventional manner. While four tanks have been shown, it is to be understood that the method of the present invention can be used in a spacecraft with any number of tanks.

The spacecraft operation is controlled by a controller shown as box 24. The controller includes sensors for monitoring the spacecraft attitude including inertia reference units or gyros. The controller 24 also controls the firing the spacecraft thrusters. The controller can be programmed for automated spacecraft control or it can execute command signals transmitted from earth and received by antenna 26, or both. While shown as a box, the controller more than likely includes components located throughout the spacecraft as is well known.

A propellant tank 22 is shown in section in FIG. 2 and contains a propellant outlet 28 and a pressurant inlet 30. The outlet 28 and inlet 30 are at opposite polar caps of the spherical propellant tank 22. The propellant tank has an axis 32 and an equatorial plane 34 perpendicular to the axis. The propellant tank includes a trap at the outlet end shown by a trap housing 36 to trap a portion of the propellant at the outlet 28. A propellant management device, consisting of vanes 38 extending from the trap housing 36, is used to attract and loosely hold the propellant to its location by the action of surface tension forces.

The propellant immobilization method will now be described with reference to FIG. 2 through FIG. 5 in the context of a stationkeeping maneuver. FIG. 2 illustrates the propellant in the tank prior to the stationkeeping maneuver, a velocity change maneuver, with the propellant 40 held in place adjacent the housing 36 by the vanes 38 of the propellant management device. The center of mass of the propellant outside of the trap housing 36 is indicated at 42. In the following illustration, the velocity change maneuver to be performed is toward the East.

The maneuver begins with the firing of the West thrusters 14 to provide a small impulse shown by arrow 44 directed toward the East. In reaction to this impulse, the propellant center of mass 42 acquires a velocity $V_0$ relative to the tank 22 in the opposite direction of the impulse 44 as shown in FIG. 3. The center of mass moves until it arrives on the West side of the tank 22 as shown in FIG. 4. As the propellant moves within the tank, the curved side wall of the tank will change the direction of the velocity of the propellant center of mass.

Once the center of mass has moved to the West side of the tank, the anti-nadir thrusters 20 are fired, producing an impulse shown by arrow 46 toward the nadir, the same direction as the current velocity $V_0$ of the propellant center of mass, as shown in FIG. 4. The impulse is the same or slightly less than the first impulse 44. In reaction to this second impulse 46, the propellant center of mass stops relative to the tank 22. Without any propellant damping effects, the impulse 46 required to stop propellant motion would be the same as impulse 44 used to start the motion. When damping effects are considered, the needed impulse 46 to stop the relative motion of the propellant center of mass is slightly less than the initial impulse 44.

Figure 5:
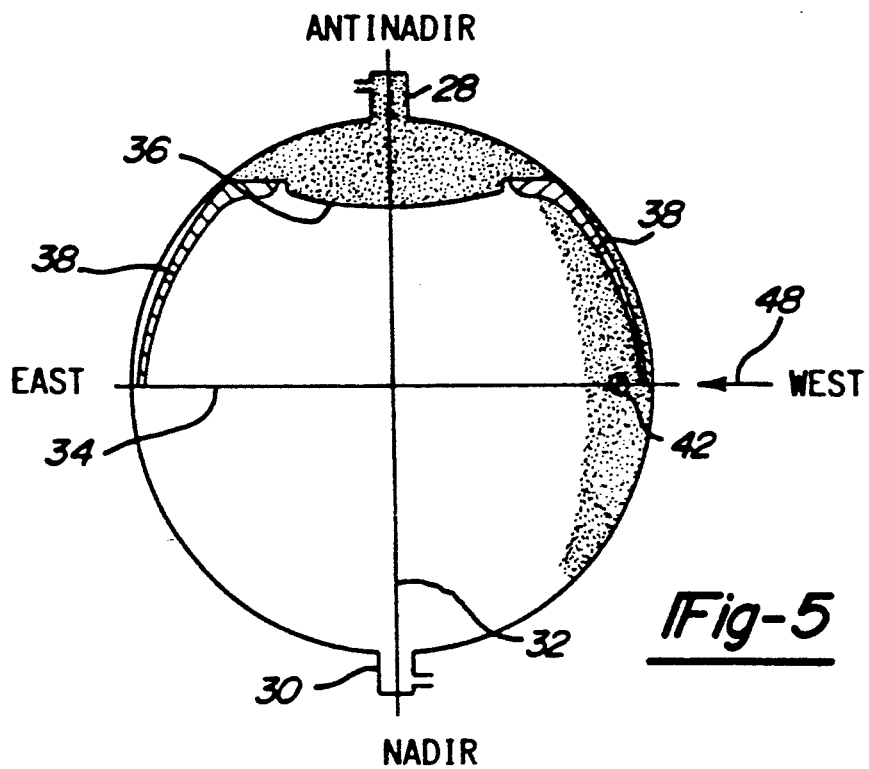

With the propellant center of mass stopped at the West side of the tank, the West thrusters 14 are again fired, creating an impulse 48, to produce the desired velocity change toward the East to complete the velocity change maneuver as shown in FIG. 5. The propellant will remain trapped in its location along the West side of the tank in reaction to the force of the West thrusters. Finally, when the maneuver is completed, the propellant slowly migrates back to its original position due to the influence of the propellant management device.

By placing the propellant center of mass 42 to the "rear" of the tank relative to the direction of the velocity change maneuver, the direction of the impulse to accomplish the maneuver, and by aligning the propellant center of mass with the center of curvature of the "rear" of the tank parallel to the direction of the velocity change, the fuel center of mass will not be caused to move relative to the tank by application of the velocity change impulse. As a result, movement of the fuel is reduced or eliminated during the velocity change maneuver such that disturbance torques acting upon the spacecraft by propellant motion are reduced or eliminated. This simplifies the required attitude correction needed during the velocity change maneuver and immediately following the maneuver. As a result, propellant usage is reduced, the spacecraft design, testing, manufacture and operation are simplified and costs are reduced.

The preferred shape for the propellant tank is spherical so that the tank has single center of curvature for all positions of the propellant center of mass. However, other tank shapes can be utilized with this invention provided the tank has a significant amount of curved walls. The essential feature of the tank shape is that the center of mass of the propellant be moved to a position in which the center of mass is in the "rear" of the tank relative to the thrust direction for the velocity change maneuver and that a line from the center of mass to the center of curvature of the "rear" of the tank be parallel to the maneuver thrust direction.

In a preferred embodiment in which the primary velocity change maneuvers will be stationkeeping in the E-W or N-S directions, a spherical tank is used and the propellant management device is located to attract the propellant to either the nadir or anti-nadir sides of the tank. Regardless of the maneuver direction, the propellant center of mass is moved approximately ninety degrees around the tank as shown in the above illustration. The direction of the first impulse to start propellant motion will preferably be in the direction of the velocity change. However, other impulse directions can be used to begin propellant motion. The direction of the second impulse to stop propellant motion will generally be normal to the velocity change.

It is to be understood that the invention is not limited to the exact method illustrated and described above, but that various changes and modifications may be made without departing from the spirit and scope of the invention as defined in the following claims.

We claim:

1. A propellant immobilizing method for use in an orbiting spacecraft to reduce propellant motion during velocity change maneuvers, said spacecraft including a propellant tank having curved side walls and at least one center of curvature for said curved side walls, a propellant management device within said propellant tank for attracting and loosely holding propellant in the tank at the location of the propellant management device and a plurality of thrusters for producing impulses in multiple directions, said method comprising the steps of:

firing a portion of said thrusters producing a first impulse whereby the propellant center of mass acquires a velocity relative to the tank in a direction opposite said first impulse direction;

allowing said propellant to move relative to said tank and follow the curved side walls of said tank until the propellant center of mass has moved to a location in which a line from said center of mass to the tank center of curvature is parallel with the direction of said desired velocity change;

firing a portion of said thrusters producing a second impulse in the direction of motion of said propellant center of mass to null the velocity of said propellant center of mass relative to said tank; and firing a portion of said thrusters to produce a third impulse in the direction of said desired velocity change to complete the desired velocity change, said third impulse being in the direction of alignment of said propellant center of mass and said tank central curvature whereby movement of said propellant center of mass relative to said tank in reaction to said third impulse is minimized.

2. The method of claim 1 wherein the magnitude of said second impulse is no more than the magnitude of said first impulse.

3. The method of claim 1 wherein said propellant moves in said tank to change the direction of motion of said propellant center of mass relative to said tank by approximately 90 degrees.

4. A propellant immobilizing method for use in an orbiting spacecraft to reduce propellant motion during velocity change maneuvers, said spacecraft including a propellant tank having a generally spherical wall, a propellant management device within said propellant tank for attracting and loosely holding propellant in the tank at the location of the propellant management device and a plurality of thrusters for producing impulses in multiple directions, said method comprising the steps of:

firing a portion of said thrusters to produce a first impulse whereby the propellant center of mass acquires a velocity relative to the tank in a direction opposite said first impulse;

allowing said propellant to move relative to said tank and follow said spherical wall of said tank until the propellant center of mass has moved to a rear portion of said tank relative to the direction of the desired velocity change where line extending from said propellant center of mass to the center of curvature of said spherical wall is parallel to the direction of said desired velocity change;

firing a portion of said thrusters to produce a second impulse in the direction of motion of said propellant center of mass to null the velocity of said propellant center of mass relative to said tank; and firing a portion of said thrusters to produce a third impulse in the direction of said desired velocity change to complete the desired velocity change, said third impulse being parallel to said line extending from said propellant center of mass to said tank center of curvature whereby movement of said propellant center of mass relative to said tank in reaction to said third impulse is minimized.

5. The method of claim 4 wherein said first and third impulses are in substantially the same direction.

6. The method of claim 4 wherein the magnitude of said second impulse is no more than the magnitude of said first impulse.

7. The method of claim 4 wherein said tank has a pair of oppositely spaced polar caps and an equatorial plane spaced midway therebetween, said propellant management device being located at one of said polar caps and the direction of said desired velocity change maneuver being parallel to said equatorial plane, and said third impulse is in a direction parallel to said plane.

8. The method of claim 7 wherein said first impulse is in the same direction as said third impulse.

9. The method of claim 7 wherein said second impulse is normal to said third impulse.

10. A spacecraft stabilized in three mutually perpendicular axes comprising:

a body;

a plurality of thrusters for producing impulses in multiple directions;

a spherical propellant tank having two opposite poles and an equatorial plane midway between said poles;

a propellant management device located in said tank at one of said poles for attracting and loosely holding liquid propellant in place adjacent said propellant management device in the absence of thrust acting on said spacecraft;

control means for firing said thrusters to perform a velocity change maneuver by first firing one or more of said thrusters to produce a first impulse in the direction of the desired velocity change whereby the propellant center of mass acquire a velocity relative to said tank, after said propellant center of mass moves to a location in which said propellant center of mass is in a rear portion of said tank relative to the direction of said velocity change and said center of mass is aligned with the center of said spherical tank in the direction of said velocity change, firing at least one thruster to produce a second impulse in the direction of motion of said propellant center of mass to stop motion of said propellant center of mass relative to said tank and subsequently firing at least one thruster to produce a third impulse in the direction of said first impulse to complete the desired velocity change.

11. The spacecraft of claim 10 wherein an axis of said tank extending through said tank poles is aligned with the nadir/anti-nadir direction of said spacecraft and said velocity change is accomplished in one of the North/South/East/West directions.

12. The spacecraft of claim 11 wherein said propellant management device is located in said tank at the anti-nadir side.

13. The spacecraft of claim 10 wherein said control means includes receiving means on board said spacecraft for receiving commands from an earth based transmitter.

* * * * *